United States Patent [19]

Döhle et al.

[11] Patent Number: 4,483,731
[45] Date of Patent: Nov. 20, 1984

[54] METHOD FOR PRODUCING A TUBULAR LOAD-BEARING HOLLOW

[75] Inventors: Günter Döhle; Michael Kolax, both of Bremen; Wolfgang Hertel, Ganderkesee, all of Fed. Rep. of Germany

[73] Assignee: Vereinigte Flugtechnische Werke GmbH, Bremen, Fed. Rep. of Germany

[21] Appl. No.: 361,150

[22] Filed: Mar. 24, 1982

[30] Foreign Application Priority Data

Apr. 4, 1981 [DE] Fed. Rep. of Germany ....... 3113791

[51] Int. Cl.³ .............................................. B29C 19/00
[52] U.S. Cl. .................................... 156/245; 156/156; 156/285; 156/289; 156/500; 264/314; 264/335; 425/396

[58] Field of Search ............... 156/242, 243, 285, 245, 156/293, 294, 381, 382, 500, 289, 156, 104; 264/314, 334, 269, 257, 258, 335, 523, 533, 573, 248, 249; 425/396, 108, 519

[56] References Cited

U.S. PATENT DOCUMENTS

| | | | |
|---|---|---|---|
| 3,183,292 | 5/1965 | Dvoracek | 264/335 |
| 3,286,305 | 11/1966 | Seckel | 425/396 |
| 3,619,446 | 11/1971 | Nauta | 264/335 |
| 3,700,519 | 10/1972 | Carter | 156/289 |
| 4,348,247 | 9/1982 | Loyd et al. | 156/156 |

Primary Examiner—Jay H. Woo
Assistant Examiner—Timothy W. Heitbrink
Attorney, Agent, or Firm—Ralf H. Siegemund

[57] ABSTRACT

A load-bearing part for aircraft or space vehicle is integrally made in a uniform manner from fiber-reinforced resin connecting endpieces of a small cross section merged via transition zones with a circular main- and central hollow. A particular method and particular tooling, for carrying out the method and making the hollow, are also disclosed.

11 Claims, 4 Drawing Figures

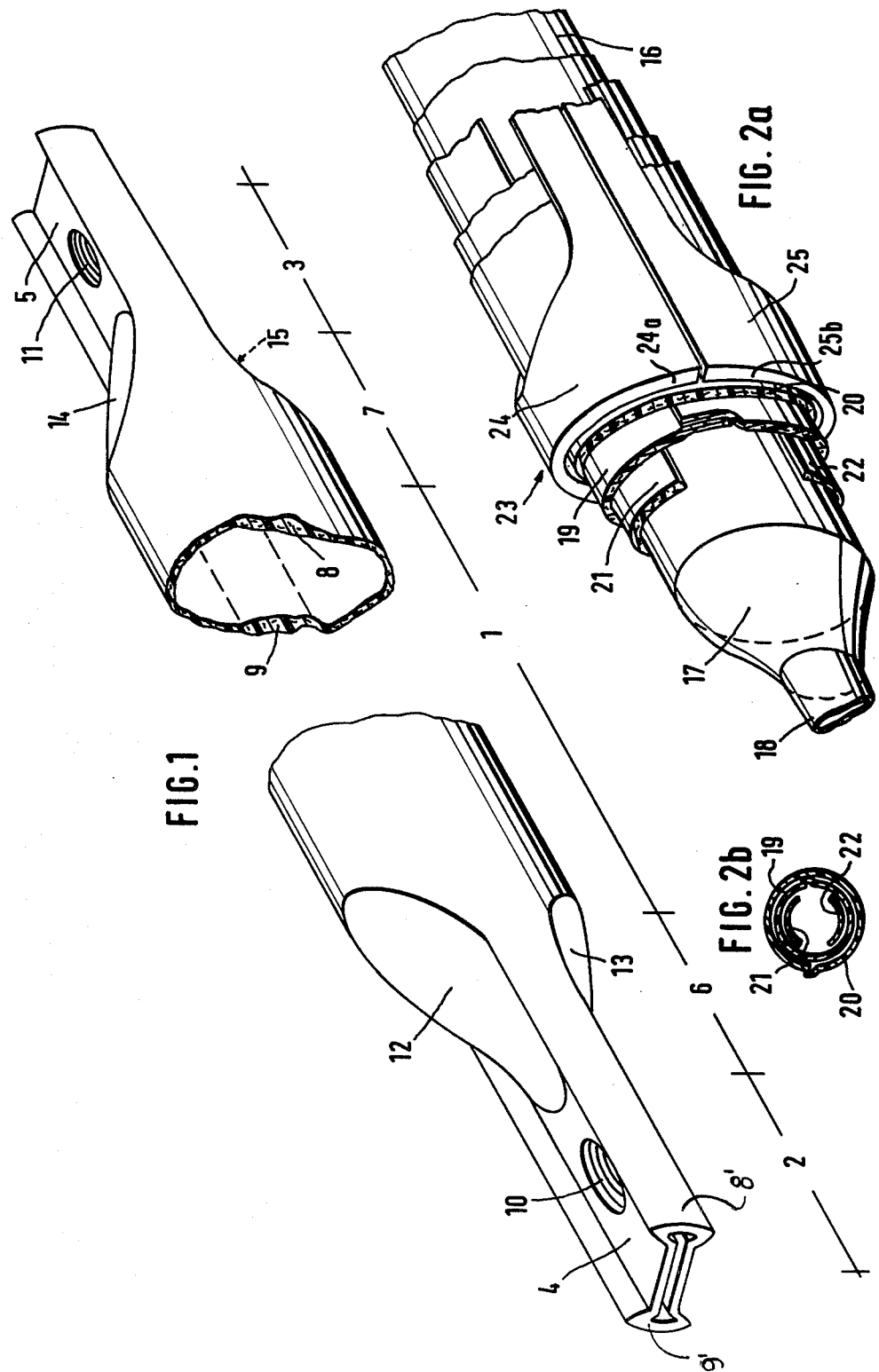

METHOD FOR PRODUCING A TUBULAR LOAD-BEARING HOLLOW

BACKGROUND OF THE INVENTION

The present invention relates to a tubular hollow made of fiber-reinforced synthetic or plastic material, particularly for use as struts or any other frame component in aircraft, space vehicles, or the like. The invention, moreover, relates to a method of making such a hollow as well as to structure for carrying out such a method.

The aircraft and space industry uses to an increasing extent fiber compound parts in lieu of metal parts because, on one hand, these new materials have a strength and stiffness which are quite comparable to the corresponding properties of metal while, on the other hand, components of basically the same configuration have a significantly lower weight as compared to metal parts. It has to be observed, however, that mechanical properties of fiber-reinforced compound components are an isotropic in contradistinction to the fact that the properties of metal are usually isotropic. On the other hand, loads are usually not expected to be omnidirectional so that fiber-reinforced parts can be constructed in such a manner that the strength-defining properties and features match the expected loads and load directions in an optimum fashion. Therefore, anisotropy is not necessarily a disadvantage, which means that, in fact, one can use these parts under significant savings of weight. An example here is, for example, struts or rotor blades in helicopter experiencing mechanical loads strictly along particular axes.

A significant problem exists in the interfacing of such a fiber-reinforced component with an applied force. For this reason, it is customary to use the fiber-reinforced component with metallic endpieces, fittings, or the like, upon which the force will act and which will distribute that force properly into the fiber-reinforced component. These additional metallic elements are usually bonded or otherwise mechanically fastened with the fiber-reinforced part. For example, it has been suggested to use the struts in the aircraft industry which are comprised of a tubular center part made of a fiber-reinforced synthetic and terminal heads are provided at the two ends of this tubular part, the heads being made of aluminum. However, such compound structure, consisting, in fact, of different materials, constitutes only a compromise, which means that the potential high-grade strength properties of the fiber-reinforced component are not fully utilized, and the low weight feasible by the utilization of these materials is to some extent compromised by the addition of metallic endpieces.

Further to the state of the art, reference is made to German Pat. No. 11 91 556 concerning, in particular, expansion molding. Thermal expansion molding is also described in the journal "FLUGREVUE INFORMATION," No. 5, Aug. 18, 1980, pp. 3 and 4. However, these references do not refer to the inherent problem of connecting endpieces to a lightweight part of structural material.

DESCRIPTION OF THE INVENTION

It is an object of the present invention to provide a hollow, made of a fiber-reinforced synthetic, which is usable directly as a structural component and material, without any need for metallic endpieces or the like.

It is an object of the present invention to provide a new and improved method for making such a new hollow.

It is another object of the present invention to provide new and improved tooling for carrying out such a method.

In accordance with the preferred embodiment of the present invention, it is suggested to provide a hollow with end portions of a reduced cross section, the end portions being contoured in the form of flat, two-separated-wall-connecting pieces being integral with a tubular, hollow, central portion. The overall integral construction of a part structural fiber compound material does not only permit its utilization in cases where previously only metallic or multipart structures had been used, but the mechanical properties of the part and the material of which it is made can be matched to the respective boundary conditions in an optimum manner. Local wall thickness enhancement, particularly in the zones of the connecting pieces, but also in longitudinal direction along the wall of the central part of the hollow, increases the stiffness of the hollow as a whole and permits, therefore, the taking-up and reaction of higher bending moments. The particular part can be made in such a manner that various portions have different wall thicknesses and, therefore, different stiffness and strength. Moreover, one can employ the so-called one-shot curing method.

In order to make a hollow in accordance with the present invention, it is suggested that a rather hard core be employed, and a hose, being slipped onto the core, as an auxiliary tooling cooperates with a mold whose cavity contour defines the outer contour of the hollow to be made. Sheet material in the form of preimpregnated fiber laminates are placed onto that core and the subassembly is placed into the mold. Additional laminates may be used whereever a local reenforcement is needed. Preferably, the hose is slightly inflated at that point so that the core can be completely removed. The hose is subsequently pressurized to urge the laminates against the mold cavity, and the mold is subjected to heat so that the impregnated fiber material is cured as it is being pneumatically forced against the interior contour of the mold. This method permits the reproducible production of struts and other supporting elements with integrated end-connecting pieces in an integral configuration and under exclusive utilization of fiber compound material. Also, the rate of production is rather high. One needs only to employ a small number of multiply or multilayer, planar-laminated, large-area, standardized laminates so that automatic lamination devices can be employed for preparing the sheet material in sufficient quantities and at a sufficiently high rate; overall production can accordingly be carried out in an economic manner. Moreover, so-called "prepreg" parts, as standardized intermediate products, made of preimpregnated fiber material, can readily be used, this being another economizing feature.

It will be noted that the inventive method entails a gradual forming process resembling, to some extent, a deep-drawing process of sheet metal and, therefore, permitting the realization of a rather high degree of deformation without distortion of the fiber structure in the part to be made and without, therefore, interfering with the integrity of the mechanical properties.

It should be noted, further, that the inventive method is quite independent from the type of fiber employed and from the type of fiber mesh in the lamina. Also, a large variety of resins and synthetics can be used in order to accomodate different requirements for structural material classifications. Another advantage of the inventive method is to be seen in that the curing of the hollow as it is being made does not have to be carried out in an autoclave; but one can use a furnace, instead. Another advantage, particularly concerning the quality of the hollow to be made, as well as aspects of a simpler, quicker, and, therefore, more economical production, is derived from the utilization of a number of features which will be explained in more detail with reference to the drawings.

As far as the employed tooling is concerned, it is suggested that a two-part, completely closed, hollow mold be used with peripheral indents or recesses operating with inserted die members. Such a mold permits the carrying-out of the above-described method in a controlled manner, particularly as far as the forming of the sheet material into a hollow, and, here particularly, the area of a reduced cross section ins concerned. The mechanical properties of the fiber material remain fully intact. The method above has been described with reference to an internal core as a preparatory tool. That core is matched to the interior of the hollow mold to such an extent that the pressurized hose will, subsequently, only require to take up relatively small and, possibly, locally varying expansions in order to urge the prepared lamina against the interior wall of the hollow mold.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

FIG. 1 is a perspective view of a hollow made in accordance with the preferred embodiment of the present invention for practicing the best mode thereof;

FIG. 2a is a perspective view into the detailed composition of the hollow shown in FIG. 1;

FIG. 2b is a cross section through a portion of such a hollow; and

Proceeding now to the detailed description of the drawings, FIG. 1 illustrates a strut or traverse support for an aircraft, the strut or traverse support being constructed as a hollow. The hollow consists basically of a fiber-reinforced synthetic, presently of a synthetic under the name "CFK," which is a carbon fiber—resin compound. This hollow includes, particularly, a central portion 1 having, at least approximately, a circular cross section. Two end portions 2 and 3 of this element are of a reduced cross section and, from an overall point of view, are, in effect, flattened in order to establish two end-connecting pieces 4 and 5. The interior cross section of these connecting pieces is significantly reduced as compared with the cross sectional area of the center portion 1. In the cross section, the configuration of endpieces 4 and 5 resembles a dumbbell. However, the wall thickness of the two connecting pieces 4 and 5 is thicker than the wall thickness of the tubular portion 1 proper.

Figure 3:
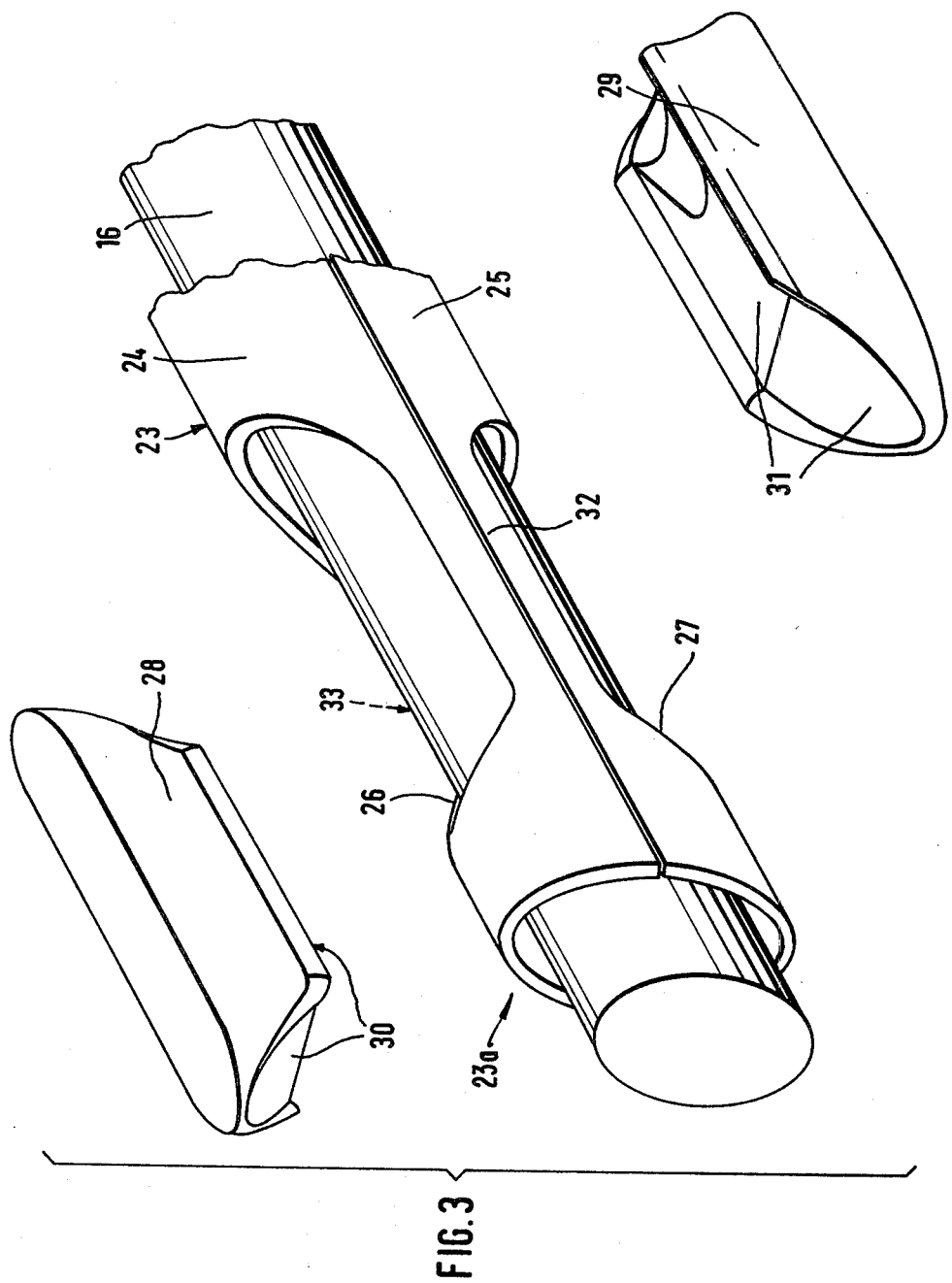
FIG. 3 is an exploded view of the tooling device in accordance with the invention.

Reference numerals 6 and 7 denote the transition zones from the tubular center portion 1 to the flat endpieces 4 and 5, and the walls of the transition portion 6 and 7 are also thicker than the walls of the tubular central part 1.

The particular element is assumed to experience bending loads and, for this reason, the wall of the entire configuration is locally thicker, particularly in the two bar- or strip-like portions 8 and 9. As far as the center portion 1 is concerned, these reinforcements 8 and 9 (reinforcements in terms of thickness, the material is fiber-reinforced throughout) are thus positioned in diametrically opposed locations. However, as far as the endpieces 4 and 5 are concerned, these particular strip portions 8 and 9 become the sidewalls 8' and 9' of the these connecting endpieces 4 and 5. The flat portions of endpieces 4 and 5 are, additionally, provided with, respectively, bores 10 and 11 for the purposes of receiving connecting sleeves, or the like.

As can be seen from FIG. 1, in particular, the inclination of the transition surfaces 12 and 13 of transition zone 6 and the surfaces 14 and 15 of transition zone 7 is relatively shallow with respect to the longitudinal axis of this particular element. Moreover, these particular surfaces are convexly contoured. This permits an optimum integration of the connecting pieces 4 and 5 into the structure of the hollow as a whole, whereby particularly excessively high, local deformations of the fiber-reinforced material are avoided.

After having described the specific structure, which is the subject matter of the invention, we turn now to the description of FIGS. 2a, 2b, and 3 for explaining the method and mode of manufacture of such a part. FIG. 2a illustrates here a certain portion which, as far as the element shown in FIG. 1 is concerned, is the left-hand end portion of the hollow in question. In particular, FIG. 2a illustrates the composition of a hollow blank assembled from preimpregnated fiber material prior to the deformation that leads to the formation of the endpieces (4 and 5). FIG. 2b illustrates the same part in cross section.

Proceeding now to FIG. 2a, one can see that a hollow blank is made, to be comprised of an, essentially, cylindrical and rather hard, internal core 16 upon which one pulls or draws a hose 17, consisting of a flexible material, such as a rubber hose. Broadly speaking, hose 17 is made of isotopically elastic material; rubber is quite suitable. The rubber hose 17 carries at one end a connecting nipple 18. The other end (17a) of hose 17 is initially open end extends over and beyond the core 16 so that the end 17a of hose can be closed by means of a clamp (not shown), particularly during the hose-inflating and hollow-forming process.

The raw material to be used is preferably of a standardized, semifinished variety, also known as "prepreg." Presently, one uses a multilayer or multiply, preimpregnated lamination of carbon fiber. From this material, two standard laminates 19 and 20 are taken (cut), and they are made to extend over the entire length of the desired hollow. Also, laminates 19 and 20 are wider than the circumference of the hollow to be made. From the same material, one provides, in addition, four head-reinforcing laminates, shown in FIGS. 2a and 2b and designated by reference numerals 21 and 22, refering here particularly to the left-hand end portion of the hollow, and ultimately becoming the lug 4 or the endpiece. The length of these additional laminates has been selected so that they extend over the respective end zones 2 and 3 as well as over the transition zones 6 and 7 to be made. The width of these reinforcing laminates 21 and 22 is approximately one-fourth of the width of the standard laminates 19 and 20.

The head-reinforcing laminates 21 and 22 are placed at the respective ends of the hollow in diametrically opposing disposition zones in FIG. 2a. Subsequently, the two standard laminates 19 and 20 are wound upon the core 16 with an overlap as defined by their width and in a manner that the overlaps face each other. These overlaps will become the reinforcing strips 8 and 9.

The entire assembly is subsequently inserted in a hollow mold 23 (FIG. 3) which has been sprayed on the inside with a hot, separating medium. This particular hollow mold is comprised of two halves, 24 and 25, being, for example, complementary elements for a cylindrical steel mold with open front faces. One end face 24a and 25b each is shown, the other one is not, but extends to the rear right in the perspective view of FIG. 3. The diameter of core 16 is selected so that, after inserting the laminate-plus-core assembly in the hollow form, there will still remain space between the interior, cavity-defining surface of the mold and the outer circumference of the wrapping of the fiber-reinforced material on the core.

As can be seen specifically from FIG. 3, the hollow mold 23 is provided with peripheral indents, 26 in mold half 24 and 27 in mold half 25. These indents are used for forming one endpiece, i.e., endpiece 4 in the hollow to be made. The drawings show but one end portion of the mold. There is, of course, a similar configuration provided for the other (right rear) endpiece. These indents or recesses 26 and 27 face each other across the hollow interior and extend over a significant portion of the periphery of the mold. Additional, supplemental mold or die elements 28 and 29 are provided in matching configurations with the indents 26 and 27. These die elements 28 and 29 are configured so that they fit exactly into these indents or recesses 26 and 27; and their forming faces or surfaces 30 and 31 respectively correspond exactly with the desired shape one wishes to impart upon the hollow blank within the range of the connecting endpiece to be made as well as in the transition zone, such as 6 thereof.

Portion 23a of the mold (and corresponding parts of die members 28 and 29) are not used for making the endpiece 4, but will result in extensions to be removed later. One simply needs that wider (left, front) portion of mold 23 in order to insert the core-plus-hose-plus-laminate assembly.

In order to provide the desired configuration, the core 16, as mentioned, is placed into the biparted mold in such a manner that the overlapping portions of the laminates 19 and 20 are situated along the bar portions 32 and 33 of the mold which separate the indents 26 and 27. The mold is then closed and pressurized air is run into the interior through nipple 18 in the hose 17 which, however, is still open at the other end so that the hose just lifts off the inserted core 16. This core 16 is now pulled out of the still open end of the hose 17 (rear, right); and now, that end of the hose 17 is closed (clamped). The interior of the mold may be temporarily evacuated for lifting the hose off the core in order to facilitate removal of the latter. Next, the pressure in hose 17 is increased sufficiently to force the laminates on the hose against the wall surfaces of the hollow 23. Against the pressure of and in the hose, the die elements 28 and 29 are now inserted in the respective recesses (26 and 27) of the mold. The flat-working surfaces of die members 28 and 29 establish the flat configuration of the endpiece 4 to be made. The hose 17 is flattened locally, but will continue to urge the laminate material against the flat and transition-forming surface poartions of die members 28 and 29. This way, the mold is completely closed. Next, the assembly is placed into a furnace, autoclave, or the like, in order to obtain curing of the fiber-reinforced synthetic while the hose 17 expands the original hollow against the various inner wall surfaces of mold 23, including die members 28 and 29, and maintains the expansion until curing has been completed. After curing, the hollow is rigid and strong and can be removed from the mold 23; the pressure in hose 17 is relieved to facilitate removal, and the hose is pulled out of one of the remaining ends of the hollow. Evacuation of the mold may further facilitate the removal of the hollow from the mold.

The hollow thus made is contour-milled thereafter, and particularly the newly formed connecting pieces 4 and 5 are worked, whereby especially the outer, round endpieces are removed. The endpieces 4 and 5 now receive their final shape. In addition, bores 10 and 11 are provided in the connecting pieces 4 and 5 (the bores are provided, it will be recalled, for receiving sleeves, or the like).

It should be mentioned that the inventive method, as described in the general sense, is not limited to the making of a particular hollow shown in the figures nor is the inventive method limited to the employment of any particular fiber and fiber compound. Rather, the method is applicable to the making of any kind of hollow having on one end or on both ends a reduced cross section. Moreover, different kinds of materials can be used (for example, a 125° C. or 175° C. curing system, or one can use polyimide systems). One may use synthetic fibers, such as an organic polymer (aramide).

The invention is not limited to the embodiments described above; but all changes and modifications thereof, not constituting departures from the spirit and scope of the invention, are intended to be included.

We claim:

1. A method of making a hollow of fiber-reinforced synthetic and with an internal restriction, comprising the steps of
   providing a solid core;
   slipping a hose made of an isotropic, elastic material onto said core;
   placing preimpregnated fiber material upon the hose and urging the material on the hose against the hose to thereby urge the hose against the core to form an assembly;
   placing said assembly into a hollow mold;
   removing said core from said hose;
   sealing said hose from one end;
   pressurizing said hose so that said fiber material is urged against interior walls of the mold;
   inserting and positioning die elements into the mold, thereby flattening the hose as well as the fiber material as placed;
   curing the impregnated fiber material while said pressure is maintained in said hose; and
   removing the completed hollow from the mold.

2. A method as in claim 1, wherein said fiber material includes two laminates, extending over a particular length, whereby overlapping portions are provided at diametrically opposite locations with regard to said hose and said core.

3. A method as in claim 1 and comprising the step of providing additional laminates in end portions of said hose, there being corresponding indents in the mold.

4. A method as in claim 3, the additional laminates being placed between said hose and said first-mentioned laminates.

5. A method as in claim 1, said core being selected so that, upon insertion of the core with placed laminates into the interior of the mold, a limited annular space remains between the laminates and the material wall of the molds.

6. A method as in claim 1, including the step of pre-pressurizing the hose for facilitating said removal of the core.

7. A method as in claim 1, including the step of evacuating the space between the interior of the mold and the inserted assembly for facilitating removal of the core from the hose.

8. A method as in claim 1, including the step of removing the core from the hose prior to insertion of the hose in the mold.

9. A method as in claim 1, including the step of spraying the interior of the mold with a hot, separating medium prior to inserting the assembly in the mold.

10. A method as in claim 1, including the additional step of evacuating the hose subsequent to curing and removing the hose from the cured hollow.

11. A method as in claim 1, and including the step of subsequently contour-milling end portions of the hollow, subsequent to the removal of the hose therefrom.

* * * * *